United States Patent
Liu et al.

(10) Patent No.: US 9,936,433 B2
(45) Date of Patent: Apr. 3, 2018

(54) METHODS AND APPARATUSES FOR MANAGING RADIO ACCESS NODE CLUSTER

(71) Applicant: Telefonaktiebolaget L M Ericsson (publ), Stockholm (SE)

(72) Inventors: Jinhua Liu, Beijing (CN); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 291 days.

(21) Appl. No.: 14/767,711

(22) PCT Filed: Feb. 21, 2013

(86) PCT No.: PCT/CN2013/071731
§ 371 (c)(1),
(2) Date: Aug. 13, 2015

(87) PCT Pub. No.: WO2014/127513
PCT Pub. Date: Aug. 28, 2014

(65) Prior Publication Data
US 2015/0358882 A1 Dec. 10, 2015

(51) Int. Cl.
*H04W 36/18* (2009.01)
*H04L 29/08* (2006.01)
(Continued)

(52) U.S. Cl.
CPC ............. *H04W 36/18* (2013.01); *H04L 67/12* (2013.01); *H04W 24/02* (2013.01);
(Continued)

(58) Field of Classification Search
CPC ................. H04W 36/18; H04W 24/02; H04W 36/0016; H04W 36/0088; H04W 36/08; H04W 84/005; H04W 48/12; H04L 67/12
See application file for complete search history.

(56) References Cited

U.S. PATENT DOCUMENTS

2010/0173626 A1\* 7/2010 Catovic ............... H04W 76/027
455/423
2011/0228777 A1 9/2011 Samajpati
(Continued)

FOREIGN PATENT DOCUMENTS

CN 102647472 A 8/2012
EP 1 737 256 A1 12/2006
WO WO 2008/110202 9/2008

OTHER PUBLICATIONS

Tao Zhou et al., titled, High-speed railway channel measurements and characterizations: a review, Journal of Modern Transportation, Dec. 2012, vol. 20, Issue 4, pp. 199-205.\*
(Continued)

*Primary Examiner* — Andrew Lai
*Assistant Examiner* — Hoyet H Andrews, III
(74) *Attorney, Agent, or Firm* — Baker Botts, LLP

(57) ABSTRACT

The present disclosure generally relates to managing a radio access node cluster (4) comprising a plurality of radio access nodes (2). By determining connectivity metrics and comparing to predefined thresholds, a decision is taken if a radio access node (2) of the radio access node cluster (4) is to be detached from radio access node cluster (4) or if a neighboring radio access node (6) is to be added to the radio access node cluster (4). All radio access nodes belonging to the radio access node cluster (4) share a common cell identifier.

20 Claims, 4 Drawing Sheets

(51) Int. Cl.
*H04W 36/00* (2009.01)
*H04W 36/08* (2009.01)
*H04W 84/00* (2009.01)
*H04W 24/02* (2009.01)
*H04W 48/12* (2009.01)

(52) U.S. Cl.
CPC ... *H04W 36/0016* (2013.01); *H04W 36/0088* (2013.01); *H04W 36/08* (2013.01); *H04W 84/005* (2013.01); *H04W 48/12* (2013.01)

(56) References Cited

U.S. PATENT DOCUMENTS

| | | | | |
|---|---|---|---|---|
| 2011/0244876 | A1 | 10/2011 | Ponnampalam et al. | |
| 2012/0039226 | A1* | 2/2012 | Yang | H04W 52/0277 370/311 |
| 2012/0071200 | A1* | 3/2012 | Bienas | H04W 48/20 455/525 |
| 2012/0209951 | A1* | 8/2012 | Enns | H04L 29/08729 709/217 |
| 2012/0302240 | A1* | 11/2012 | Tamaki | H04W 36/0011 455/436 |
| 2014/0135008 | A1* | 5/2014 | Yu | H04W 36/0077 455/436 |
| 2015/0147993 | A1* | 5/2015 | Yin | H04B 1/10 455/277.1 |
| 2015/0156708 | A1* | 6/2015 | Tietz | H04W 4/02 455/434 |

OTHER PUBLICATIONS

Tian, L. Tian, J. Li, Y. Huang, J. Shi and J. Zhou, "Seamless Dual-Link Handover Scheme in Broadband Wireless Communication Systems for High-Speed Rail," in IEEE Journal on Selected Areas in Communications, vol. 30, No. 4, pp. 708-718, May 2012. doi: 10.1109/JSAC.2012.120505.*

Tao Zhou et al., titled, "High-speed railway channel measurements and characterizations: a review", Journal of Modern Transportation, Dec. 2012, vol. 20, Issue 4, pp. 199-205.*

Heikki Kaaranen et al.: "UMTS Networks: Architecture, Mobility and Services (2)", Jul. 1, 2005, pp. 110-122 and pp. 364-367—2005.

Extended European search Report/Supplementary European Search Report/European Search Opinion for Application No./Patent No. 13875922.0-1854 / 2959634 PCT/CN2013071731—Aug. 5, 2016.

European Patent Office, Communication pursuant to Article 94(3) EPC; Appln No. 13 875 922.0-1854; Ref.: RL/PX214302EP; 7 pages; dated Sep. 15, 2017.

3GPP TR 36.828 V.2.0.0; Technical Report; 3rd Generation Partnership Project; Technical Specification Group Radio Access Network; Further Enhancements to LTE TDD for DL-UL Interference Management and Traffic Adaptation; (Release 11), Jun. 2012.

PCT Notification of Transmittal of the International Search Report and the Written Opinion of the International Searching Authority, or the Declaration for International application No. PCT/CN2013/071731, Nov. 21, 2013.

* cited by examiner

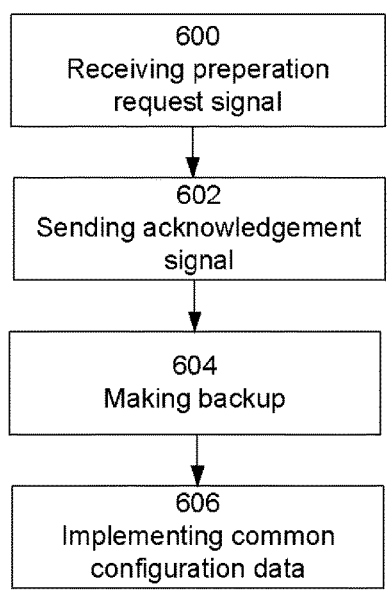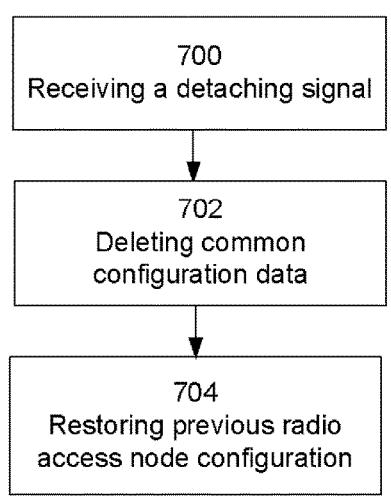
FIG. 6
FIG. 7

METHODS AND APPARATUSES FOR MANAGING RADIO ACCESS NODE CLUSTER

PRIORITY

This nonprovisional application is a U.S. National Stage Filing under 35 U.S.C. § 371 of International Patent Application Serial No. PCT/CN2013/071731, filed Feb. 21, 2013, and entitled "METHODS AND APPARATUSES FOR MANAGING RADIO ACCESS NODE CLUSTER."

TECHNICAL FIELD

Embodiments of the present disclosure generally relate to managing a radio access node cluster. More particularly, embodiments disclosed herein relate to a method performed by a control unit for adding and detaching radio access nodes to and from the radio access node cluster. Embodiments herein also relate to methods performed in radio access nodes belonging to or neighboring the radio access node cluster. Furthermore, embodiments of the present disclosure are directed to a corresponding control unit and radio access nodes.

BACKGROUND

Today there is a quick global expansion of the use of high speed transportation vehicles e.g. trains. This causes a big challenge when it comes to wireless communications, and in particular when performing handover when travelling on such a train. The high speed of the trains, usually around 200-350 km/h, will put demanding time constraints on the wireless network when preparing and executing handover, due to the short period of time it takes for the high speed train to run through a cell. Normally, the whole handover procedure from the detection of a strong neighboring cell to the connection to the target cell may take about 500 ms, depending on different timer settings, such as Time-to-trigger, measurement period etc. If one assumes that the cell of a radio access node has a radius of 500 meters, a high speed train will pass through as cell in about 10 to 20 seconds leading to a high volume of signaling and thus take a large portion of user equipment, UE, resources and system node resources. If the wireless network fails to meet these high time constraints, it might cause a high dropping ratio or non-service from the network.

Another challenge when traveling at high speed, and especially when a larger number of users travel at high speed in the same transportation vehicle, e.g. a train, is that all connected users, i.e. connected UEs want to perform handover at the same time. This will cause a high volume of random access attempts and also overhead signaling. Depending on the number of users, this might lead to a bottleneck in the Random Access Channel, RACH. The users may thus experience frequent service interruptions or low-quality service during handover even if the handover is successful at the end.

In order to reduce frequent handovers of high speed, users attempts have been made to create a sector along the high speed railway having an area that is shaped along the moving direction of the train. There have also been attempts to use special parameter configurations to speed up the handover procedure. Even if such attempts have reduced the above described problems to some extent, the high speed of a train still requires a rather high handover rate of the UEs and there are still a large numbers of UEs that need to be handed over at approximately the same time.

Thus, there is a need to find new ways to improve cellular communications for passengers, i.e. UEs, travelling on high speed transportation vehicles.

SUMMARY

In view of the above, an improved way to reduce the handover rate for UEs traveling on high speed vehicles, such as high speed trains, would be advantageous.

It is therefore a general object of embodiments of the present disclosure to reduce or eliminate the number of handovers for a UE during high speed travel.

According to an aspect, a method is provided, which is performed by a control unit for managing a radio access node cluster comprising a plurality of radio access nodes. The method comprises: determining a first connectivity metric for radio access nodes neighboring the radio access node cluster and then checking if the determined first connectivity metric meets a first criterion. The method further comprises sending a preparation request signal to the neighboring radio access nodes for which the first connectivity metric meets the first criterion, said preparation request signal comprising at least the following common configuration data for all radio access nodes comprised in the radio access node cluster; a common cluster cell identifier, ID, and user information about user equipments, UEs, that are served by the radio access node cluster. The method further comprises: receiving, by the control unit an acknowledgement signal from the neighboring radio access nodes that are ready to implement the common configuration data, and adding the neighboring radio access nodes, from which the acknowledgement signal has been received, to the radio access node cluster.

In various embodiments the method performed by the control unit may further comprise: determining a second connectivity metric for all radio access nodes comprised in the radio access node cluster, checking if the determined second connectivity metric meets a second criterion, and sending a detaching signal to the radio access nodes, for which the second connectivity metric meets the second criterion.

The first and second connectivity metric may be periodically or continuously determined and the first connectivity metric may be the distance between the high speed vehicle and the radio access nodes neighboring the radio access node cluster or the channel quality indicator, CQI, the uplink power headroom, the reference signal received power, RSRP or the uplink received power strength of the radio access node cluster.

According to another aspect a method is provided, which is performed by a radio access node for detaching said radio access node from a radio access node cluster, the radio access node cluster comprising a plurality of radio access nodes which all have common configuration data, such as a common cluster cell identifier, ID, and user information about user equipments, UEs, that are served by the radio access node cluster. The method comprises receiving a detaching signal from a control unit, deleting the common configuration data, and restoring the configuration of the radio access node to the original configuration in use prior to the cluster configuration.

According to a further aspect a control unit is provided for managing a radio access node cluster comprising a plurality of radio access nodes, said control unit comprises a communication interface arranged for wireless communication, a processor and a memory storing computer program code which, when run in the processor, causes the control unit to determine a first connectivity metric for radio access nodes neighboring the radio access node cluster, check if each determined first connectivity metric meets a first criterion, send a preparation request signal to the neighboring radio access nodes for which the first connectivity metric meets the first criterion, said preparation request signal comprising at least the following common configuration data for all radio access nodes comprised in the radio access node cluster; a common cluster cell identifier, ID, and user information about user equipments, UEs, that are served by the radio access node cluster, receive an acknowledgement signal from the neighboring radio access nodes that are ready to implement the common configuration data, and add the neighboring radio access nodes from which the acknowledgement signal has been received to the radio access node cluster.

In various embodiments the control unit is further caused to determine a second connectivity metric for all radio access nodes comprised in the radio access node cluster, check if the determined second connectivity metric meets a second criterion, and send a detaching signal to the radio access nodes, for which the second connectivity metric meets the second criterion.

According to a yet another aspect a radio access node neighboring a radio access cluster is provided, the radio access node cluster comprising a plurality of radio access nodes. The neighboring radio access node comprises a communication interface arranged for wireless communication, a processor and a memory storing a computer program code which, when run in the processor, causes the radio access node to receive a preparation request signal from a control unit, said preparation request signal comprising at least the following common configuration data for all radio access nodes comprised in the radio access node cluster; a common cluster cell identifier, ID, and user information about user equipments, UEs, that are served by the radio access node cluster, send an acknowledgement signal to the control unit for informing said control unit that the neighboring radio access node is ready to implement the common configuration data, make a backup of the present cell configuration of the neighboring radio access node, and implement the common configuration data.

According to a yet a further aspect a radio access node belonging to a radio access node cluster is provided, the radio access node cluster comprising a plurality of radio access nodes which all have common configuration data, such as a common cluster cell identifier, ID, and user information about user equipments, UEs, that are served by the radio access node cluster. The radio access node comprises a communication interface arranged for wireless communication, a processor and a memory storing a computer program code which, when run in the processor, causes the radio access node to receive a detaching signal from a control unit, delete the common configuration data, and restore the configuration of the radio access node to the original configuration in use prior to the cluster configuration.

An advantage of embodiments herein is that in the perspective of the UE there is no need to perform handover between different cells when travelling on a high speed trains, due to the fact that the UE is connected to a common cell ID, belonging to a radio access node cluster to which the UE is connected during travel onboard of a high speed vehicle.

BRIEF DESCRIPTION OF THE DRAWINGS

These and other aspects, features and advantages of embodiments of the present disclosure will be apparent and elucidated from the following description of various embodiments, reference being made to the accompanying drawings, in which:

FIG. 6 is a flow chart showing an exemplary method; and

FIG. 7 is a flow chart showing an exemplary method.

DETAILED DESCRIPTION

The technology will now be described more fully hereinafter with reference to the accompanying drawings, in which certain embodiments of the technology are shown. The technology may, however, be embodied in many different forms and should not be construed as limited to the embodiments set forth herein; rather, these embodiments are provided by way of example so that this disclosure will be thorough and complete, and will fully convey the scope of the present disclosure to those persons skilled in the art. Like numbers refer to like elements throughout the description.

Figure 1:
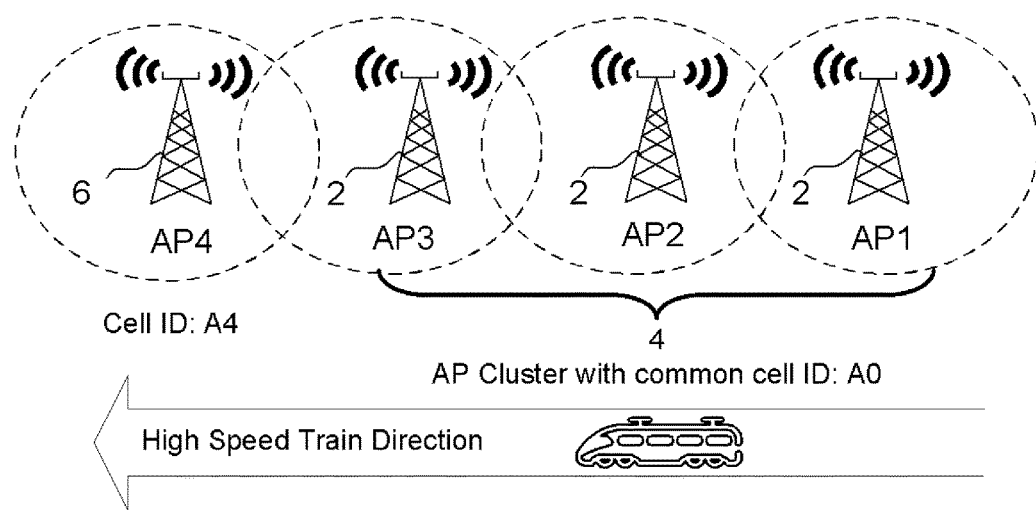
FIG. 1 is a schematic diagram illustrating an exemplary embodiment of a radio access node cluster.

FIG. 1 is a schematic diagram illustrating an exemplary embodiment of a radio access node cluster 4. In this illustrative embodiment the radio access node cluster 4 comprises three different radio access nodes 2, also denoted as access points AP1, AP2 and AP3. However, it should be understood that the radio access node cluster 4 may comprise an arbitrarily number of radio access nodes or points depending on the circumstances. The cluster size, i.e. the number of radio access nodes 2 within the radio access node cluster 4, may for example be determined based on the radio access node 2 coverage, and the length of the high speed train, etc. The overall coverage of the radio access node cluster 4 should be large enough to cover the entire length of the train. The principle is the same regardless of the numbers of radio access nodes 2 making up the radio access node cluster 4. All the radio access nodes 2 that are part of the radio access node cluster 4 have a common cell identity, ID, A0. As is depicted in FIG. 1 a high speed train is in the range of the radio access node cluster 4. A UE that is onboard the high speed train will experience the radio access node cluster 4 as one access point due to the fact that all radio access nodes 2 comprised in the radio access node cluster 4 share a common cell ID. The radio access nodes 2 may be implemented as an Evolved Node B (eNB or eNodeB) in LTE, but may also be implemented in the radio access technology Global System for Mobile communications, GSM or Universal Mobile Telecommunications System, UMTS or WiMax.

In FIG. 1 there is also depicted a radio access node, which is a neighboring access node 6. The neighboring radio access node 6 is in FIG. 1 also denoted as radio access point AP4. The neighboring radio access node has a cell ID that is different from the radio access node cluster 4, in this case A4. In context of the present disclosure the expression radio access nodes neighboring the radio access node cluster is to be interpreted as being one or several neighboring radio access nodes.

Figure 2:
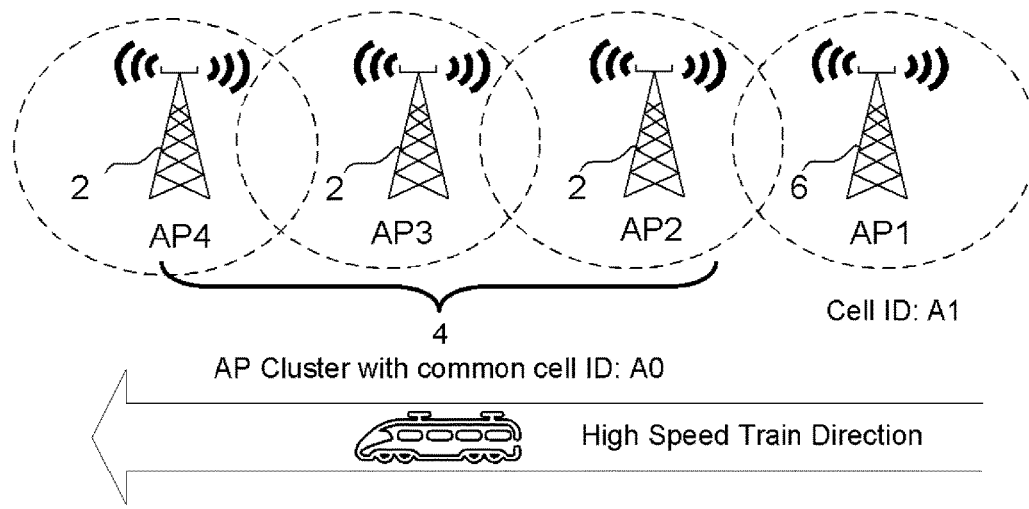
FIG. 2 is a schematic diagram illustrating another exemplary embodiment of a radio access node cluster.

FIG. 2 is a schematic diagram illustrating another exemplary embodiment of a radio access node cluster 4. FIG. 2 is essentially the same as FIG. 1 but now the high speed train has moved and the radio access node cluster 4 has adapted dynamically in relation to the movement of the high speed train. As may be seen in FIG. 2 the radio access point AP1 is no longer part of the radio access node cluster 4 and has changed its cell ID from the common cell ID, A0, to the cell ID A1. At the same time the neighboring cell 6 in FIG. 1 is no longer a neighboring cell in FIG. 2, but is now a part of the radio access node cluster 4. The radio access node cluster 4 still has the same common cell ID, A0, even if it is comprises new set of radio access points AP2, AP3 and AP4. How the radio access node cluster 4 changes dynamically depending on the position of the high speed train will be further described in conjunction with FIG. 5. It should also be noted that by high speed train or vehicle it is meant a vehicle traveling faster than 150 km/h.

Figure 3A:
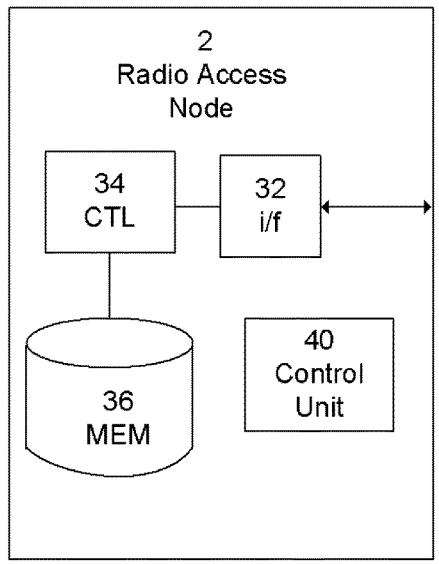
FIG. 3a is a schematic view of an exemplary radio access node, comprising a control unit.
Figure 3B:
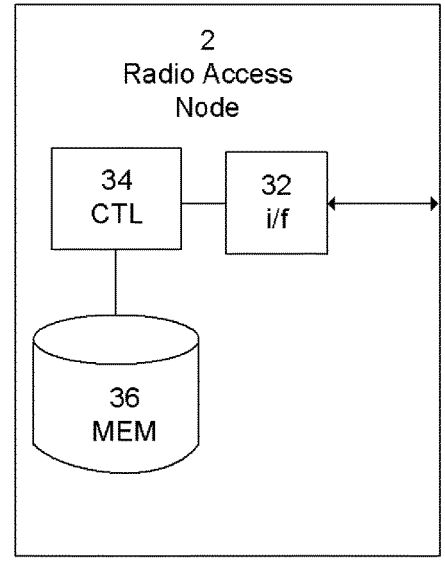
FIG. 3b is a schematic view of another exemplary radio access node.
Figure 4:
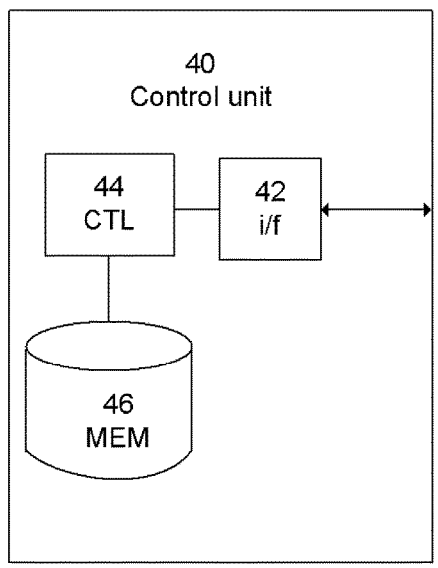
FIG. 4 is a schematic view of an exemplary control unit.

Turning now to FIGS. 3a, 3b and 4, the radio access nodes 2 and a control unit 40 for managing the radio access node cluster 4 will be described in further detail. It should be understood that the same description as below for the radio access node may be used for a neighboring radio access node 6. In a hardware point of view, there may be no difference between the radio access node 2 and the neighboring radio access node 6. The difference in context of the present disclosure is that the radio access nodes 2 are a part of the radio access node cluster 4 and the neighboring radio access nodes 6 are not.

FIG. 3a is a schematic view of an exemplary radio access node 2, comprising a control unit 40. This radio access node 2 comprises a controller (CTL) or a processor 34 comprising e.g. any suitable Central Processing Unit, CPU, microcontroller, Digital Signal Processor, DSP, etc., capable of executing computer program code. The computer program may be stored in a memory (MEM) 36. The memory 36 may be any combination of a Read And write Memory, RAM, and a Read Only Memory, ROM. The memory 36 may also comprise persistent storage, which, for example, can be any single one or combination of magnetic memory, optical memory, or solid state memory or even remotely mounted memory. The radio access node 2 further comprises a communication interface (i/f) 32 arranged for wireless communication with other devices or nodes, such as a UE onboard a high speed train, other radio access nodes 2 of the radio access node cluster 4 or neighboring radio access nodes 6.

In FIG. 3a the radio access node 2 also comprises a control unit 40, which may be a separate part of the radio access node 2 or may also be implemented by the existing components; controller 32, memory 36 and interface 32, of a radio access node. If the control unit 40 is an integrated part of the radio access node 2, either as separate entity or realized by existing components, the radio access node 2 may be a master node for the radio access node cluster 4. It should be noted that the role of such a master node may be taken by any of the radio access nodes 2 of the cluster 4 and may change over time as the radio access node cluster 4 dynamically changes over time. Such master node manages the adding and detaching of radio access nodes to the radio access node cluster 4 and may for example send necessary information and/or instructions to the radio access nodes 2 for dynamically joining the radio access node cluster 4. Such information may for example comprise served user contexts, radio resource allocations, security configurations and information regarding the network, such as the cell ID configuration and the sub frame configuration via a backhaul connection. Instead of being integrated in a radio access node 2, the control unit 40 may also be realized as a standalone unit as depicted by FIG. 3b. In such a case the control unit 40 may be onboard the high speed train.

FIG. 4 is a schematic view of an exemplary control unit 40. The control unit 40 basically comprises the same components as the radio access node 2 and is used to manage the radio access node cluster 4 as mentioned above. The controller unit 40 comprises a controller (CTL) or a processor 44 comprising e.g. suitably a Central Processing Unit, CPU, microcontroller, Digital Signal Processor, DSP, etc., capable of executing computer program code. The computer program may be stored in a memory (MEM) 46. The memory 46 may be any combination of a Read And write Memory, RAM, and a Read Only Memory, ROM. The memory 46 may also comprise persistent storage, which, for example, can be any single one or combination of magnetic memory, optical memory, or solid state memory or even remotely mounted memory. The control unit 40 further comprises a communication interface (i/f) 32 arranged for wireless communication with other devices or nodes, such as radio access nodes 2 of the radio access node cluster 4 and neighboring radio access nodes 6.

Figure 5:
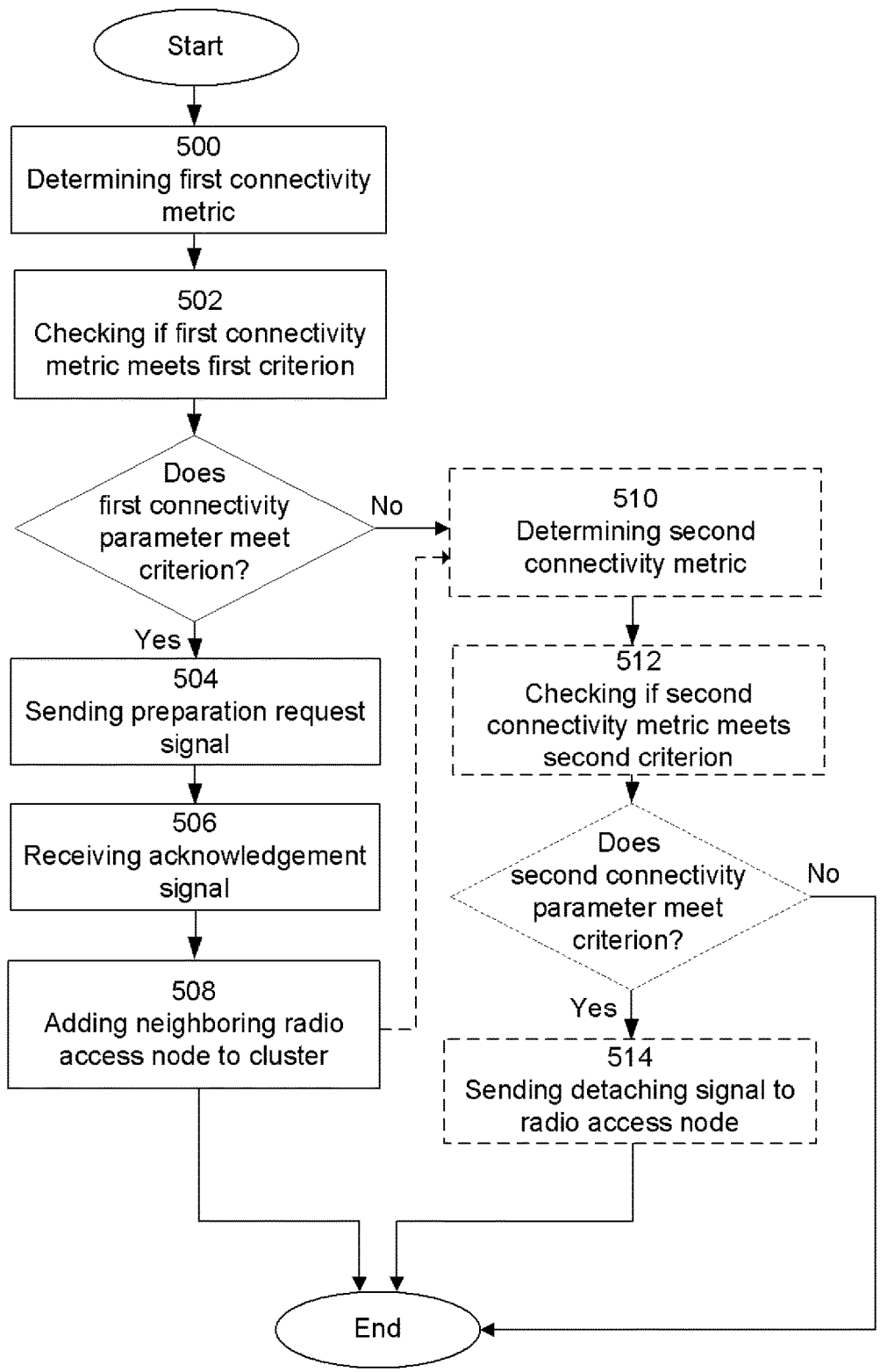
FIG. 5 is a flow chart showing an exemplary method.

Turning now to FIG. 5, a method performed by the control unit 40 for managing the radio access node cluster 4 will be described. FIG. 5 is a flow chart showing an exemplary method. The method starts in a first step 500 with determining a first connectivity metric for radio access nodes 6 neighboring the radio access node cluster 4. The first connectivity metric may be any parameter that affects the connectivity of the radio access node cluster 4. Examples of first connectivity metrics include but are not limited to the distance between the high speed train and the radio access nodes 6 neighboring the radio access node cluster 4, uplink sounding signal strength received, the channel quality indicator, CQI, the uplink power headroom, the reference signal received power, RSRP or the uplink received power strength of the radio access node cluster 4. The first connectivity metric may be determined periodically or continuously depending on the specific connectivity metric and how much network resources that specific connectivity metric allocates.

When it comes to the distance between the high speed train and the neighboring radio access nodes 6, it may be the distance from the centre of the train to a neighboring node 6 or from any other defined point of the train, such any of its ends, or from a control unit 40 onboard of the train.

After the first connectivity metric has been determined for the radio access nodes 6 neighboring the radio access node cluster 4, the method proceeds in step 502 with checking 502 if the determined first connectivity metrics meet a first criterion. Such a criterion may be a first predefined threshold. If the first connectivity metric is the distance between the train and the neighboring radio access nodes 6, the first predefined threshold may be X meters and the first criterion is met if the determined first connectivity metric is below X. If the first connectivity metric instead is the signal strength, the predefined threshold may be Y and the first criterion is met if the signal strength is above Y.

The distance to neighboring radio access nodes 6 can be preconfigured or communicated via the X2 protocol. Depending on the distance between the neighboring radio access nodes 6 and the train the radio access node cluster 4 may determine which neighboring radio access nodes 6 that are candidates to be added to the radio access node cluster 4 within a predetermined time.

The method proceeds with step 504, sending a preparation request signal to the neighboring radio access nodes 6 for which the first criterion is met, said preparation request signal comprising at least the following common configuration data for all radio access nodes 2 comprised in the radio access node cluster 4; the common cluster cell ID, and user information about user equipments, UEs, that are served by the radio access node cluster 4. The preparation request signal may furthermore comprise radio resource control, RRC, configurations and traffic load of the radio access node cluster 4. In step 506 the control unit 40 is receiving an acknowledgement signal from the neighboring radio access nodes 6 that are ready to implement the common configuration data, and in step 508 the control unit 40 is adding the neighboring radio access nodes 6, from which the acknowledgement signal has been received, to the radio access node cluster 4.

Thus, in this way it is possible for the control unit 40 to add neighboring radio access nodes 6 to the radio access node cluster 4 if they meet the first criterion. However, as the high speed train travels forward, there may also be radio access nodes 2 belonging to the radio access node cluster 4 having weak connectivity metrics, such as it is hard for such nodes to be part of the cluster. To this end, in an optional step 510 the control unit 40 is determining a second connectivity metric for all radio access nodes 2 comprised in the radio access node cluster 4. The second connectivity metric may, as the first connectivity metric, be any parameter that affects the connectivity of the radio access node cluster 4, such as the distance between the train and the neighboring radio access nodes 6, the channel quality indicator, CQI, the received sounding signal strength, the uplink power headroom, the reference signal received power, RSRP or the uplink received power strength of the radio access node cluster 4. Also, the second connectivity metric may be determined periodically or continuously depending on the specific connectivity metric as mentioned above.

The method proceeds in step 512 with checking if the determined second connectivity metric meets a second criterion. Such a criterion may be a second predefined threshold. If the second criterion (threshold) that is met is determined in the same way as for the first criterion (threshold) as has been described above and is therefore not repeated again.

In step 514 the control unit 40 is sending a detaching signal to the radio access nodes 2, for which the second connectivity metric meets the second criterion. Thus, a radio access node 2 that no longer fulfills the second criterion will be detached from the radio access node cluster 4.

If the first connectivity metric is the distance between the train and the neighboring radio access nodes 6, the second predefined threshold may be greater than the first predefined threshold or the first or second predefined threshold may have the same value. If the second predefined threshold is greater than the first predefined threshold, it means that the threshold for adding a radio access node to the radio access node cluster 4 is lower than the threshold for detaching a radio access node from said cluster.

If on the other hand the connectivity metric is the channel quality indicator, CQI, the uplink power headroom, the received sounding signal strength, the reference signal received power, RSRP or the uplink received power strength of the radio access node cluster 4, the first predefined threshold may be greater than the second predefined threshold or the first or second predefined threshold may have the same value. If the first predefined threshold is greater than the second predefined threshold, it means, as for the distance above, that the threshold for adding a radio access node to the radio access node cluster 4 is lower than the threshold for detaching a radio access node from said cluster.

In exemplary embodiments, a detached radio access node may be substituted directly by a new added radio access node. In this way, it would be possible to transfer the RRC configurations and traffic load of the radio access node cluster 4 directly from the radio access node to be detached to the new added radio access node.

Turning now to FIG. 6, a method performed by a radio access node 2 neighboring the radio access node cluster 4 for adding said neighboring radio access node 6 to the radio access node cluster 4 will be described. FIG. 6 is a flow chart showing an exemplary method. In step 600 the neighboring radio access node 6 is receiving a preparation request signal from the control unit 40, said preparation request signal comprising at least the following common configuration data for all radio access nodes 2 comprised in the radio access node cluster 4: a common cluster cell ID and user information about user equipments, UEs, that are served by the radio access node cluster 4. The preparation request signal may furthermore comprise RRC configurations and traffic load of the radio access node cluster 4. In step 602 the neighboring radio access node is sending an acknowledgement signal to the control unit 40 for informing said control unit 40 that the neighboring radio access node 6 is ready to implement the common configuration data. The neighboring radio access node 6 is then in step 604 making a backup of the present cell configuration of the neighboring radio access node 6, and in step 606 implementing the common configuration data.

FIG. 7 shows a flow chart of an exemplary method performed by a radio access node 2 for detaching said radio access node 2 from a radio access node cluster 4, the radio access node cluster 4 comprising a plurality of radio access nodes 2 which all have common configuration data, such as a common cluster cell ID and user information about the user equipments, UEs, that are served by the radio access node cluster 4. The method starts in step 700 by receiving 700 a detaching signal from the control unit 40. As mentioned above, the detaching signal is generated in response to that a second criterion is met. In step 702 the radio access node 2 is deleting the common configuration data, such as the common cell ID, and in step 704 restoring the configuration of the radio access node 2 to the original configuration in use prior to the cluster configuration.

Thus, various embodiments have been described in which radio access nodes in the vicinity of the high speed train are selected dynamically as cluster members, i.e. according to periodic or continuous tracking of the high speed trains location and speed in relation to ambient radio access nodes or the channel quality indicator, CQI, the uplink power headroom, the reference signal received power, RSRP or the uplink received power strength of the radio access node cluster 4. At the same time, radio access nodes that are moving far away from the high speed train are dynamically removed from the radio access node cluster. Users, i.e. UEs onboard on the train are not aware of this process and from an UE perspective the cell ID of the radio access node cluster is always kept unchanged during this dynamic process of adding and detaching radio access nodes to the cluster. This means that the served UEs do not need to perform any handover process during the travelling period on the high speed train. With other words, the network side conveys all necessary steps itself without any UE handover action.

With embodiments of the present technology, the problem of frequent handover of a large number of users at the same time is avoided. The experience of the users inside the high speed train can be substantially improved. The dynamic adding and detaching of radio access nodes also allows for radio access nodes to serve "normal" traffic when no train is in the neighborhood, i.e. when the radio access node is not part of the radio access node cluster. Thus, higher spectrum efficiency is achieved for the radio access nodes.

Although the present disclosure has been described above with reference to specific exemplary embodiments, it is not intended to be limited to the specific form set forth herein. In the pending claims, the term "comprise/comprises" does not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Reference signs in the claims are provided merely as a clarifying example and should not be construed as limiting the scope of the claims in any way.

The invention claimed is:

1. A method performed by a control unit for managing a radio access node cluster comprising a plurality of radio access nodes, said method comprising,
   determining a first connectivity metric for radio access nodes neighboring the radio access node cluster,
   checking if each determined first connectivity metric meets a first criterion,
   sending a preparation request signal to the neighboring radio access nodes for which the first connectivity metric meets the first criterion, said preparation request signal comprising at least the following common configuration data for all radio access nodes comprised in the radio access node cluster: a common cluster cell identifier (ID) and user information about a plurality of user equipments (UEs) aboard a moving vehicle that are served by the radio access node cluster,
   receiving an acknowledgement signal from the neighboring radio access nodes that are ready to implement the common configuration data, and
   adding the neighboring radio access nodes, from which the acknowledgement signal has been received, to the radio access node cluster.

2. The method according to claim 1, further comprising, determining a second connectivity metric for all radio access nodes comprised in the radio access node cluster,
   checking if the determined second connectivity metric meets a second criterion, and
   sending a detaching signal to the radio access nodes, for which the second connectivity metric meets the second criterion.

3. The method according to claim 1, wherein the first and second connectivity metric are periodically or continuously determined.

4. The method according to claim 1, wherein the first connectivity metric is the distance between the high speed vehicle and the neighboring radio access nodes.

5. The method according to claim 1, wherein the first connectivity metric is a channel quality indicator, CQI, a received sounding signal strength, an uplink power headroom, a reference signal received power, RSRP or an uplink received power strength of the radio access node cluster.

6. The method according to claim 1, wherein the first criterion is a first predefined threshold and the second criterion is a second predefined threshold and wherein the first predefined threshold is greater than the second predefined threshold or wherein the first and the second predefined threshold have the same value.

7. The method according to claim 1, wherein the preparation request signal comprises radio resource control, RRC, configurations and traffic load of the radio access node cluster.

8. A method performed by a radio access node neighboring a radio access cluster for adding said neighboring radio access node to the radio access node cluster, the radio access node cluster comprising a plurality of radio access nodes, said method comprising,
   receiving a preparation request signal from a control unit, said preparation request signal comprising at least the following common configuration data for all radio access nodes comprised in the radio access node cluster: a common cluster cell identifier (ID) and user information about a plurality of user equipments (UEs) aboard a moving vehicle that are served by the radio access node cluster,
   sending an acknowledgement signal to the control unit for informing said control unit that the neighboring radio access node is ready to implement the common configuration data,
   making a backup of the present cell configuration of the neighboring radio access node, and
   implementing the common configuration data.

9. The method according to claim 8, wherein the preparation request signal further comprises RRC configurations and traffic load of the radio access node cluster.

10. A method performed by a radio access node for detaching said radio access node from a radio access node cluster, the method comprising:
   configuring each radio access node of the radio access node cluster to have common configuration data including a common cluster cell identifier (ID) and user information about of a plurality of user equipment (UEs) aboard a moving vehicle;
   receiving a detaching signal from a control unit,
   deleting the common configuration data, and
   restoring the configuration of the radio access node to the original configuration in use prior to the cluster configuration.

11. A control unit for managing a radio access node cluster comprising a plurality of radio access nodes, said control unit comprising:
   a communication interface arranged for wireless communication; a processor; and a memory storing computer program code which, when run in the processor, causes the control unit to:
   determine a first connectivity metric for radio access nodes neighboring the radio access node cluster,
   check if each determined first connectivity metric meets a first criterion,
   send a preparation request signal to the neighboring radio access nodes for which the first connectivity metric meets the first criterion, said preparation request signal comprising at least the following common configuration data for all radio access nodes comprised in the radio access node cluster: a common cluster cell identifier (ID) and user information about a plurality of user equipments (UEs) aboard a moving vehicle that are served by the radio access node cluster, receive an acknowledgment signal from the neighboring radio access nodes that are ready to implement the common configuration data, and add the neighboring radio access nodes, from which the acknowledgement signal has been received, to the radio access node cluster.

12. The control unit according to claim 11, which is further caused to determine a second connectivity metric for all radio access nodes comprised in the radio access node cluster, check if the determined second connectivity metric meets a second criterion, and send a detaching signal to the radio access nodes, for which the second connectivity metric meets the second criterion.

13. The control unit according to claim 11, which is further caused to periodically or continuously determine the first and second connectivity metric.

14. The control unit according to claim 11, wherein the first connectivity metric is the distance between the high speed vehicle and the neighboring radio access nodes.

15. The control unit according to claim 11, wherein the first connectivity metric is a channel quality indicator, CQI, an uplink power headroom, a reference signal received power, RSRP or an uplink received power strength of the radio access node cluster.

16. The control unit according to claim 11, wherein the first criterion is a first predefined threshold and the second criterion is a second predefined threshold and wherein the first predefined threshold is greater than the second predefined threshold or wherein the first and the second predefined threshold have the same value.

17. The control unit according to claim 11, wherein the preparation request signal further comprises radio resource control, RRC, configurations and traffic load of the radio access node cluster.

18. A radio access node neighboring a radio access cluster, the radio access node cluster comprising a plurality of radio access nodes, and said neighboring radio access node comprising:

a communication interface arranged for wireless communication; a processor; and a memory storing a computer program code which, when run in the processor, causes the radio access node to:

receive a preparation request signal from a control unit, said preparation request signal comprising at least the following common configuration data for all radio access nodes comprised in the radio access node cluster: a common cluster cell identifier (ID) and user information about a plurality of user equipments (UEs) aboard a moving vehicle that are served by the radio access node cluster, send an acknowledgement signal to the control unit for informing said control unit that the neighboring radio access node is ready to implement the common configuration data, make a backup of the present cell configuration of the neighboring radio access node, and implement the common configuration data.

19. The radio access node according to claim 18, wherein the preparation request signal further comprises RRC configurations and traffic load of the radio access node cluster.

20. A radio access node belonging to a radio access node cluster comprising a plurality of radio access nodes, the radio access node comprising:

a communication interface arranged for wireless communication; a processor; and a memory storing a computer program code which, when run in the processor, causes the radio access node to:

configure the radio access node to have a common configuration as the plurality of radio access nodes, the common configuration including a common cluster cell identifier (ID) and user information about a plurality of user equipment (UEs) aboard a moving vehicle that are served by the radio access node cluster;

receive a detaching signal from a control unit, delete the common configuration data, and restore the configuration of the radio access node to the original configuration in use prior to the cluster configuration.

* * * * *